United States Patent [19]
Sackett

[11] Patent Number: 6,128,076
[45] Date of Patent: Oct. 3, 2000

[54] APPARATUS FOR MEASURING TRUCK TILT AND PREVENTING ROLL-OVER

[76] Inventor: Robert Sackett, 8752 Langholm Dr., El Cajon, Calif. 92021

[21] Appl. No.: 08/424,806

[22] Filed: Apr. 19, 1995

[51] Int. Cl.[7] ....................................... G01C 9/18
[52] U.S. Cl. .............................................. 356/249
[58] Field of Search ................... 356/148, 249; 33/333, 366; 250/222.1, 231, 575, 577

[56] References Cited

U.S. PATENT DOCUMENTS

| | | | |
|---|---|---|---|
| 3,813,556 | 5/1974 | Beer et al. ............................... | 250/575 |
| 4,154,000 | 5/1979 | Kramer ..................................... | 33/366 |
| 4,658,508 | 4/1987 | Oberg ....................................... | 33/333 |
| 4,869,590 | 9/1989 | Feist et al. ............................... | 356/249 |

Primary Examiner—Samuel A. Turner
Attorney, Agent, or Firm—Frank D. Gilliam

[57] ABSTRACT

An apparatus for measuring side-to-side tilt of vehicles such as trucks, trailers and the like that elevate one end of a bin to dump material therefrom. A curved transparent tube filled with liquid except for one gas bubble is mounted on the vehicle. A series of light emitters are arranged along one side of the tube with a corresponding series of light detectors along the other side. The detectors detect light passing through the liquid but not through the bubble. The resulting signals are transmitted to at least one light bar having a series of light emitters, such as incandescent lamps or light emitting diodes. An electronic circuit processes the tube detector signals and causes the light bar to light emitters in a pattern corresponding to the degree of tilt. An audible alarm and a circuit for stopping bin lifting when tilt reaches a predetermined limit are provided.

8 Claims, 5 Drawing Sheets

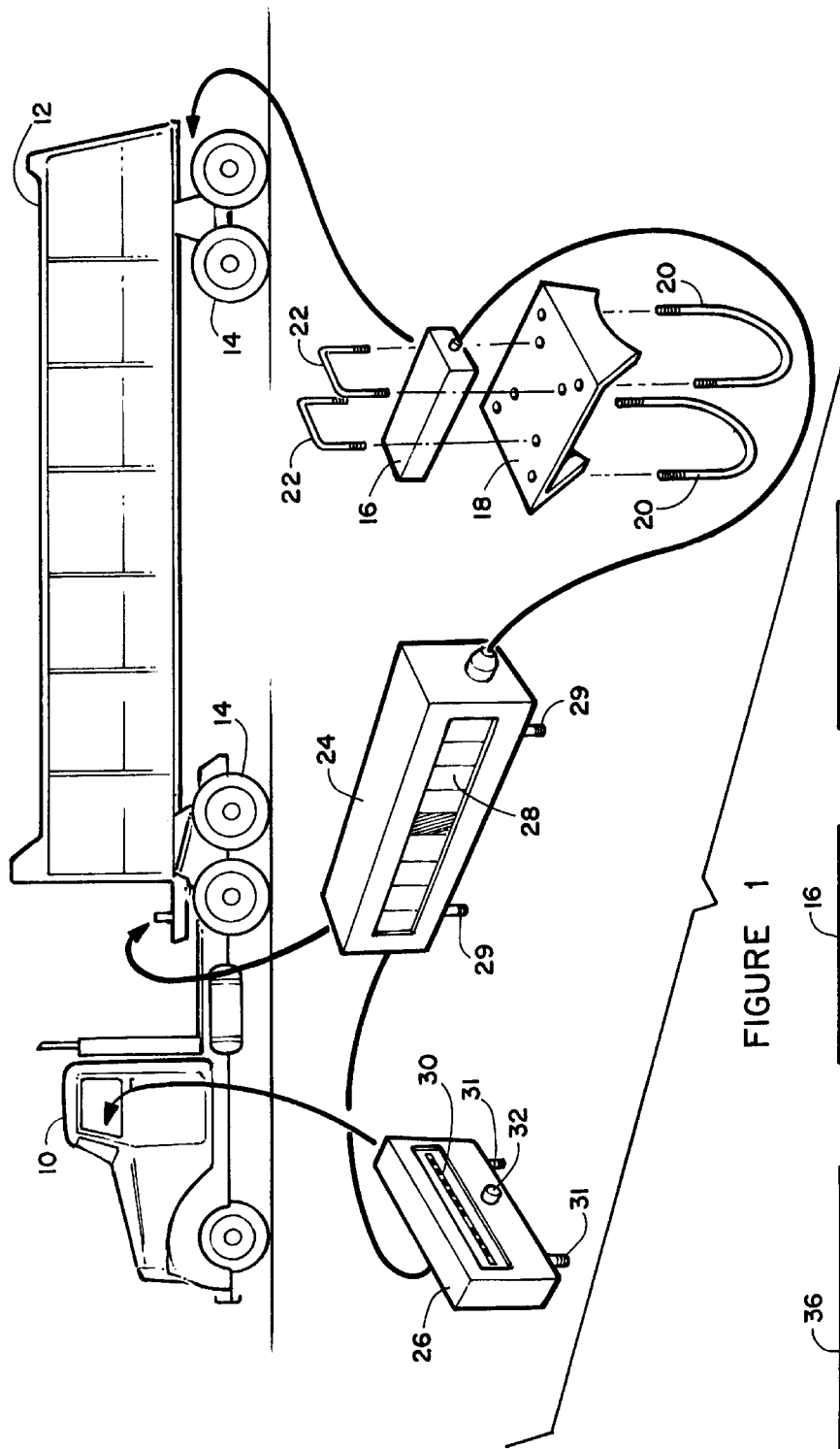

APPARATUS FOR MEASURING TRUCK TILT AND PREVENTING ROLL-OVER

BACKGROUND OF THE INVENTION

This invention relates in general to devices to prevent side roll-over of dump trucks during dumping operations and, more specifically, to measure side tilt, display the tilt and sound an alarm and/or automatically stop elevation of the trailer in the event of a dangerous tilt.

A variety of dump trucks have been developed and are in use for hauling material such as sand, gravel, asphalt, trash and the like in a truck or trailer mounted bin and dumping the material by elevating the front of the bin and allowing the material to slide out through a back door or gate very long bins mounted on trailers are used to carry a large amount of heavy material. When the front end of the bin is raised very high to assure that the material will slide out, a very long moment arm is created. If the vehicle is tilted even very slightly to the side, the entire vehicle is likely to roll over and be severely damaged and may injure the operator. With very long trailer mounted dump bins, with an eight foot wheelbase, it is dangerous to have one side even seven inches or so higher or lower than the other side.

It is difficult for the driver to "feel" the slight degree of tilt that can be dangerous with very long dump bins, in particular with tractor-trailer combinations where the tractor might be on level ground while the trailer is on sloping ground. Various spirit levels and the like have been used in the truck cab to indicate the degree of tilt. These often do not have sufficient accuracy to accurately show the small degree of tilt that may be dangerous with very long dump bins. Again, the angle of tilt of a tractor may be much different than the tilt of a trailer in a tractor-trailer combination. A level indicator may be included on the trailer, but this will require that the driver leave the tractor, check the level and return to the cab to begin the dumping operation. This check may be overlooked where rapid transportation and dumping turn-around times are necessary. Further, most levels lack the required accuracy.

Thus, there is a continuing need for improved apparatus for accurately measuring the degree of side tilt of a dump truck or trailer, indicating the actual tilt, preferably by the relative height of one side compared to the other, providing a clear and accurate display of the relative tilt to an operator in a tractor cab or near a trailer and to sound an alarm and/or automatically stop the elevation of the dump bin front end if a safe tilt is exceeded.

SUMMARY OF THE INVENTION

The above-noted problems, and others, are overcome by the apparatus of this invention which basically comprises a sturdy, accurate, tilt measuring device mounted on a dump truck or trailer and an easily visible display on the trailer or exterior of a dump truck showing the amount of tilt. Preferably, a second display is provided in the vehicle cab so that the degree of tilt can be observed without leaving the cab. For maximum safety, a controller is provided to sound a loud audible alarm if an excessive tilt is present and to shut down the bin elevating mechanism before a height is reached that is excessive in view of the tilt.

An interface to a conventional small computer or microprocessor may be provided to allow the display means to be programmed to sound the alarm and display warnings at different degrees of tilt, and/or change the degree of tilt indicated by the display light patterns, since a given variation in side to side wheel height, and resulting vehicle tilt, may be very dangerous with a load of heavy material, such as gravel, concrete chunks or asphalt and safe with a light load of material such as grain or tree clippings.

BRIEF DESCRIPTION OF THE DRAWING

Details of the invention, and of preferred embodiments thereof, will be further understood upon reference to the drawing, wherein:

FIG. 1 is a schematic illustration of the assembly components in conjunction with a typical vehicle;

FIG. 2 is a block diagram of the level detection, display and associated components of the assembly;

DETAILED DESCRIPTION OF PREFERRED EMBODIMENTS

Figure 3:
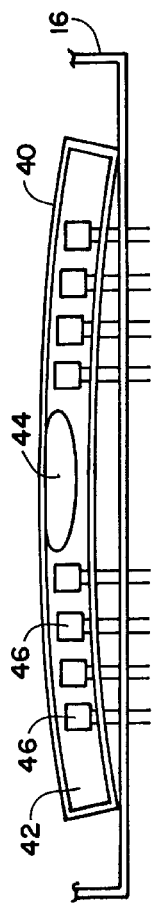
FIG. 3 is a schematic elevation view of the tilt detection device.

As schematically shown, the system is installed on a vehicle such as tractor 10 and trailer 12. Basically, the apparatus measures sideways tilt of trailer 12 and displays the degree of tilt in terms of differences in level of wheels 14 on one side and the wheels on the opposite side.

The tilt detector and display assembly as schematically illustrated in FIG. 1 and 2 comprises a tilt detector 16 (detailed in FIGS. 3–9), mounted on an axle by bracket 18 and U-bolts 20 and 22, a large, highly visible tilt display 24 mounted at the front of trailer 12 and a smaller tilt display 26 mounted in the cab of tractor 10. A controller 27, not seen in FIG. 1)included in the housing containing small display 26 in the tractor cab, receives tilt signals from detector 16 and actuates displays 24 and 26, sounds an alarm and stops the hydraulic dumping action when safe limits are exceeded.

Preferably, larger display 24 uses incandescent bulbs (not seen) each behind one of a series of windows 28 so that the tilt angle can be indicated by illumination of differing patterns of windows for different angles. Incandescent bulbs provide bright illumination that can be seen for some distance, even on bright sunny days. For optimum results, the height of each window 28 should be from about 2 to 4 inches, with a width of from about 2 to 4 inches, so that the display can be easily seen by someone outside cab 10, near the front to the tractor-trailer combination. The incandescent bulbs are powered by 12 VDC power from tractor 10, with connections made in the same manner as the stop lights on the back of trailer 12. Display 24 can be mounted in any suitable manner, such as by bolts 29 extending through any convenient panel and secured by nuts (not shown).

The in-cab display 26 can be much smaller, since it is close to the driver and is shielded from direct sunlight. For best results, a linear array of light emitting diodes (LED's) 30. The pattern of illuminated LED's indicating different tilt angles should be the same as the larger display 24. LED's are powered by the tractor battery system and draw little current. A variable brightness control 32 is preferably provided so that a lower brightness can be used at night than in bright, sunny, conditions. Display 24 can be mounted in any suitable manner, typically on the cab dashboard, such as by bolts 31 extending through any convenient panel and secured by nuts (not shown).

Just prior to dumping, the tilt detector system is turned on. If the displays 24 and/or 26 show that the angle of sideways tilt is within safety limits, the front end of container on trailer 12 is raised hydraulically to the dumping position. If the tilt angle changes as the container is raised, the operator observing the displays can stop the dumping action. If the tilt angle reaches a dangerous degree, exceeding a pre-set limit, an audible and/or visual alarm 34 sounds and conventional interlock switch 36 the hydraulic system will be automatically actuated to prevent further elevation of the container and return it to the lowered position.

Figure 4:
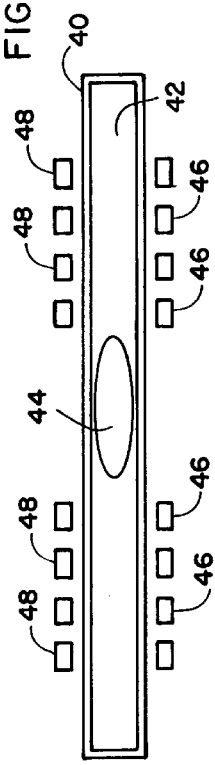
FIG. 4 is a schematic plan view of the tilt detection device.

FIGS. 3 and 4 schematically show the tilt detector in elevation and plan view, respectively. A transparent tube 40, mostly filled with a transparent liquid such as water, alcohol, etc. Where freezing temperatures are anticipated, a liquid 42 that will not freeze at the expected low temperatures is preferred.

Tube 40 is curved so that when installed on a dump truck or dump trailer, a bubble 44 will form at the top center of the tube. If detector 16 enclosing tube 40 is tilted in the plane of the tube, bubble 44 will move toward one end of the tube. A series of light sources 46, preferably light emitting diodes (typically model SEP 8506-3 from the Honeywell) which emit infrared radiation, are arranged along one side of tube 40. On the opposite side of tube 40 a light detector 48, preferably an infra red responsive NPN phototransistor (typically model SDP8406-2 from Honeywell), is positioned opposite each slight source 46. The liquid in tube 40 acts as a positive lens, concentrating light from each source 46 toward the corresponding detector 48. When tube 40 is tilted, bubble 44 moves to a position between at least one source/detector pair. The bubble acts as a negative lens, scattering light from the source, so that less light reaches the detector. This difference in light level at the detectors is used to operate the displays, as detailed in the description of the electrical circuit in FIGS. 5–8.

Figure 5:
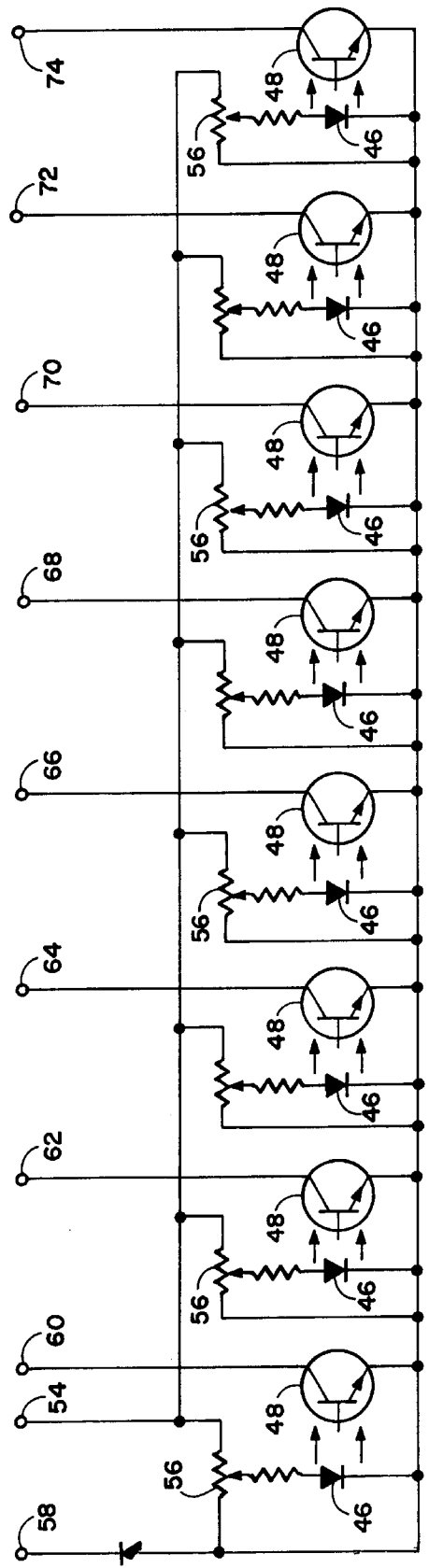
FIG. 5 is a schematic electronic diagram of the tilt detection circuit.

FIG. 5 is a schematic electric circuit for the portion of the system between the tilt detector 16 and the incandescent light display 24 and/or the LED display 26.

When switch 50 (seen in FIG. 6), power from the vehicle battery 52 is supplied to the detector circuit of FIG. 5 through connection 54. This turns on all 8 IR emitters 46 of detector 16. The intensity of each emitter 46 can be adjusted with variable resistors 56, typically having a range of 1 to 20 K ohms. Where liquid 42 is between an emitter 46 and the corresponding phototransistor 48 the light is concentrated, as discussed above, turning on the phototransistor.

Figure 6:
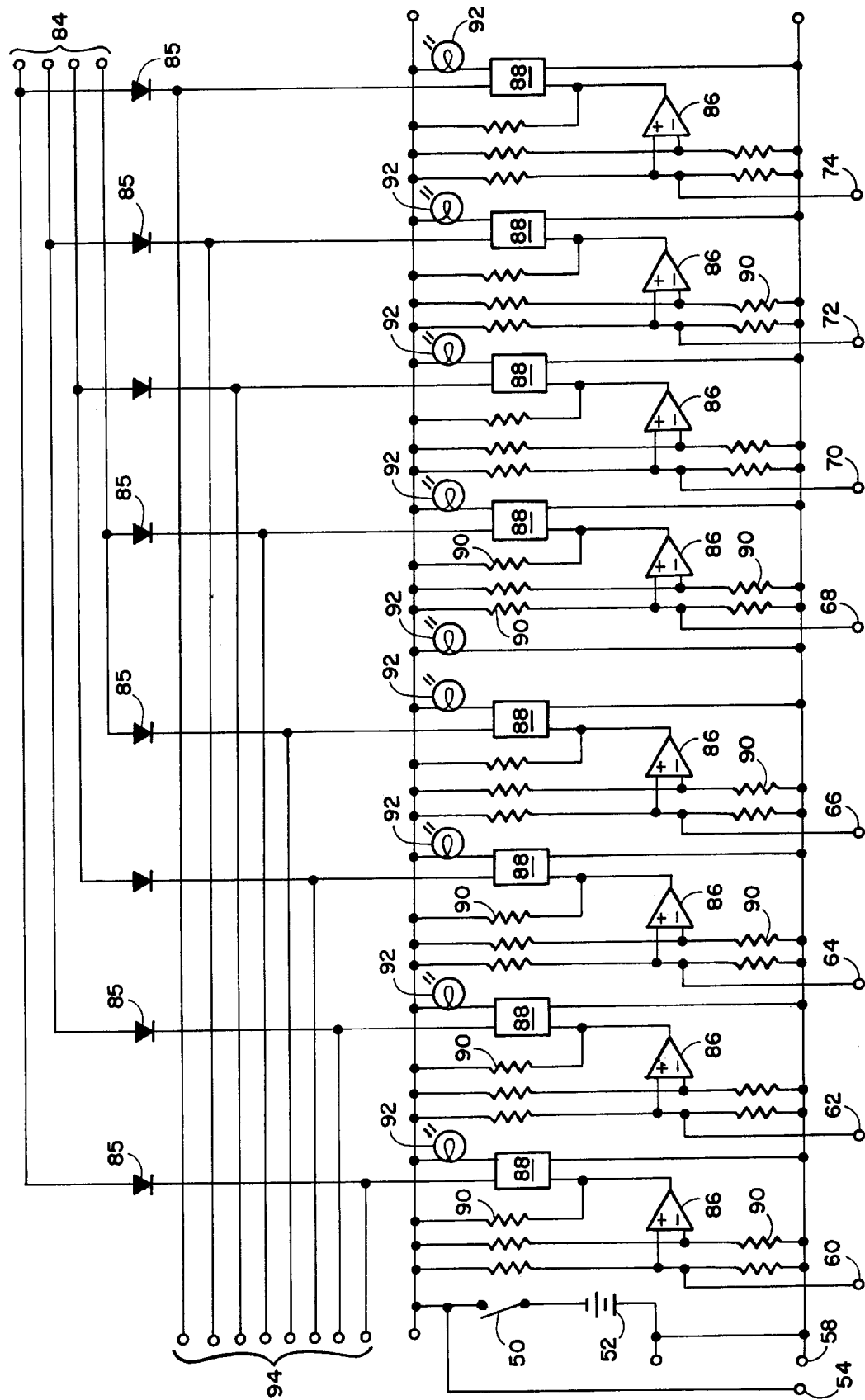
FIG. 6 is a schematic electronic diagram of the exterior light display circuit.
Figure 7:
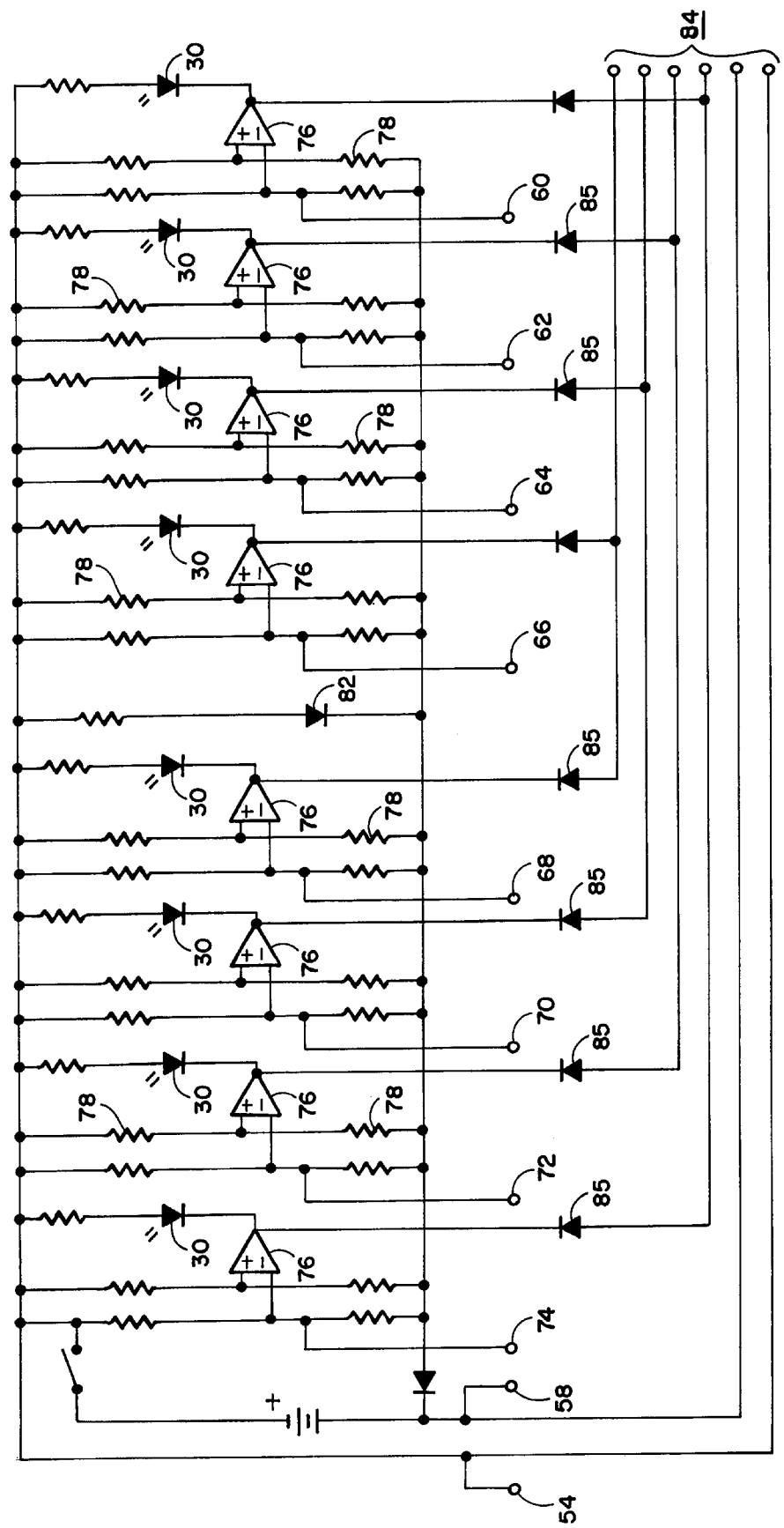
FIG. 7 is a schematic electronic diagram of the in cab light display circuit.

Connections 58–74 shown in FIG. 5 connect to the correspondingly numbered connections in FIGS. 6 (showing the circuit portion for the incandescent light display 24) and FIG. 7 (showing the circuit portion for the LED light display 26).

The "on" state of phototransistors 48 (FIG. 5) causes the outputs of comparators 76 of the LED display (FIG. 7) to maintain a high (+positive) state by pulling the voltage from voltage dividers (resistors) 78 to ground, thereby biasing LED's 30 to an "off" condition. LED 82 of the LED display stays on as long as switch 50 is closed. LED 82 shows the system is in operation and is preferably of a different color than LED's 30. Comparators 76 are preferably LM339 integrated circuits from National Semiconductor. The LED's are each typically a 4306R from Industrial devices.

When tube 40 is tilted bubble 44 moves between an emitter 46 and a phototransistor, causing light to be scattered to such a low intensity that the corresponding phototransister 48 turns off. The off state of phototransistor 48 causes the outputs of the corresponding comparator 76 to change from a high (+positive) to a low (−negative) state by not pulling the voltage to ground of the voltage dividers 56, thereby turning on the corresponding LED's. The LED display is connected to an on board computer interface output, through connections 84 via diodes 85, with the computer programmed in a conventional manner to light a selected pattern of display lights and/or LED's. Typically the computer interface connections transmit a low (negative) 4 bit binary code, indicating right tilt or left tilt and the degree of tilt. If desired, a computer need not be used and the display pattern will be the same as the as the pattern of turn on for LED's 78.

When switch 50 is closed, power is supplied to the light driver circuit portion shown in FIG. 6. The light driver circuit operates in the same manner as the LED circuit except the outputs of comparators 86 (which may be integrated circuits of the sort described above) are the reverse of the LED display 26 when the level detector unit 16 is in a level position and vice versa when in a tilted position. For example, phototransistors 88 looking at one set of voltage divider resistors 90, phototransistor 88 and incandescent light 92 of the light driver circuit, phototransistor 88 is preferably an N-channel mosfet of the sort available from Harris under the IRFD-113 designation and requires a positive power supply to its gate to turn it on. When the tilt detector 16 is in a level position comparator IC 86 is in a low state thereby sinking to ground the voltage through resistor 90 to the gate of transistor 88 which keeps that transistor 88 and incandescent light 92 off. When the detector is not level, the output of the comparator 86 corresponding to the location of bubble 44 changes to a high state, turning on the corresponding transistor and light 92.

Figure 8:
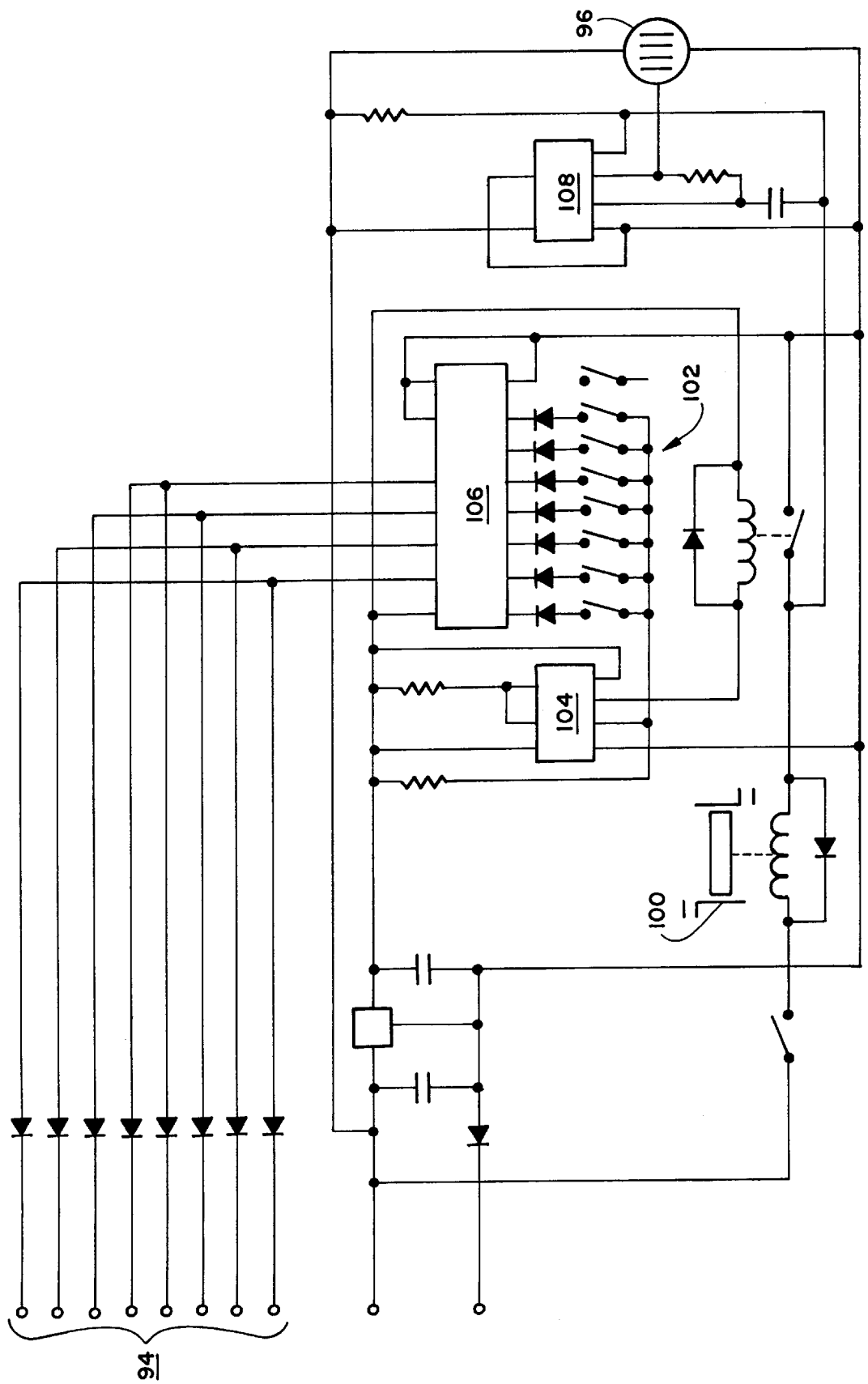
FIG. 8 is a schematic electronic diagram of the tilt limit circuit.

Connections 94 of the light driver circuit of FIG. 6 are connected to the corresponding connections 94 as shown in tilt limit circuit of FIG. 8. The light driver circuit may also be connected to a computer controller, as described above, through connections 84 and diodes 85.

As shown in FIG. 8, when switch 50 (FIG. 6) is closed, power is supplied to the light driver circuit (FIG. 6), the LED driver circuit (FIG. 7, the level detector (FIG. 3) and the tilt limit circuit (FIG. 8). The tilt limit circuit can be set to sound an audio alarm and/or shut down the hydraulic lift system through a normally open relay (or air solenoid valve, as desired) 100, to prevent the container from being further elevated when a selected out-of-level condition is detected. Typically, the level difference from side to side of the trailer is from about 1.75 to 6.75 inches in 0.75 inch increments. A selected combination of open or closed contacts in switch assembly 102 determining the program of the tilt limit circuit for integrated circuit line driver 104, typically a NE555N from National Semiconductor, which controls normally open relay 100, which in turn controls an air solenoid preventing further elevation of the trailer container and/or sounds audio alarm 96 via integrated circuit pulse generator, typically another NE555N. A fixed 5 volt regulator is provided to regulate the voltage for the TTL 5 v circuit. Integrated circuit 106, typically a DM74154N from National Semiconductor is a demultiplexer to program the line driver 104. In operation, when the contacts of switch assembly 102 are closed and tilt detector 16 is tilted until the furthest incandescent light 92 on either side of the center light turns on the audio alarm will sound and the hydraulic lift system will be deactivated.

Thus, this system provides easily observed displays for indicating the degree of tilt of a truck or trailer and provides an alarm and means for limiting elevation in the event a dangerous degree of tilt develops during a lift.

While certain specific relationships, materials and other parameters have been detailed in the above description of preferred embodiments, those can be varied, where suitable, with similar results. Other applications, variations and ramifications of the present invention will occur to those skilled in the art upon reading the present disclosure. Those are intended to be included within the scope of this invention as defined in the appended claims.

I claim:

1. An apparatus for measuring side-to-side tilt of a vehicle and displaying indicia showing the amount of tilt present which comprises:

a curved transparent tube having two closed ends and a center;

a liquid within said tube filling the tube except for a single gas bubble;

means for supporting said tube on a vehicle having a dump bin and means for elevating one end of said dump bin, with said tube lying in a vertical plane with said ends lowest so that said bubble will be at about said tube center when said supporting means is level, the distance along said tube between a bubble location and said tube center indicating tilt in said supporting means;

a series of light emitting means along a first side of said tube;

a series of light detecting means along a second side of said tube, each light detecting means directly opposite a light emitting means;

electronic means for receiving signals from each of said light detecting means indicative of whether liquid or said bubble is adjacent to each light detecting means;

said electronic means including means for automatically stopping elevating of said bin when a predetermined vehicle tilt limit is reached;

display means operatively connected to said electronic means for producing a visible display indicative of the degree of tilt of said supporting means; and an audible alarm means and means for actuating said audible alarm means when said degree of tilt reaches a predetermined limit.

2. The apparatus according to claim 1 wherein said display means includes a light bar having a series of light emitters and means for causing said light bar to display lights in patterns indicative of different degrees of supporting means tilt.

3. The apparatus according to claim 2 further including means for mounting said light bar in a cab of a vehicle carrying a elevatable dump bin, said light emitters are light emitting diodes and said electronic means includes means for lighting said light emitting diodes in said pattern.

4. The apparatus according to claim 1 wherein said electronic means further includes means for varying the degree of tilt indicated by said light pattern.

5. The apparatus according to claim 1 wherein said means for supporting said tube comprises a bracket for mounting on an axle of said vehicle with said bubble at said tube center when said axle is level.

6. An apparatus for measuring side-to-side tilt of a vehicle having a bin and means for elevating one end of said bin to dump out contents of said bin and displaying indicia showing the amount of tilt present which comprises:

a curved transparent tube having two closed ends and a center;

a liquid within said tube filling the tube except for a single gas bubble;

means for mounting said tube on an axle of said vehicle with said tube lying in a vertical plane with said ends lowest so that said bubble will be at about said tube center when said supporting means is level, the distance along said tube between a bubble location and said tube center indicating tilt in said supporting means;

a series of light emitting means along a first side of said tube;

a series of light detecting means along a second side of said tube, each light detecting means directly opposite a light emitting means;

electronic means for receiving signals from each of said light detecting means indicative of whether liquid or said bubble is adjacent to each light detecting means; and display means comprising at least one light bar having a series of light emitters operatively connected to said electronic means for producing a visible display pattern indicative of the degree of tilt of said supporting means, and said electronic means including means for predetermining the degree of tilt to be indicated by said light pattern and for stopping lifting of said bin end when vehicle tilt reaches a predetermined angle.

7. The apparatus according to claim 6 further including means for mounting said light bar in a cab attached to said vehicle, said light emitters are light emitting diodes and said electronic means for lighting said light emitting diodes in said pattern.

8. The apparatus according to claim 6 wherein said electronic means further includes means for varying the degree of tilt indicated by said light pattern.

* * * * *